(12) United States Patent
Kwak

(10) Patent No.: US 11,053,805 B2
(45) Date of Patent: Jul. 6, 2021

(54) VANE RING ASSEMBLY, METHOD OF ASSEMBLING THE SAME, AND GAS TURBINE INCLUDING THE SAME

(71) Applicant: DOOSAN HEAVY INDUSTRIES & CONSTRUCTION CO., LTD., Changwon-si (KR)

(72) Inventor: Joo Hwan Kwak, Changwon-si (KR)

(*) Notice: Subject to any disclaimer, the term of this patent is extended or adjusted under 35 U.S.C. 154(b) by 222 days.

(21) Appl. No.: 16/234,481

(22) Filed: Dec. 27, 2018

(65) Prior Publication Data
US 2019/0226347 A1     Jul. 25, 2019

(30) Foreign Application Priority Data
Jan. 22, 2018    (KR) ........................ 10-2018-0007903

(51) Int. Cl.
*F01D 5/30*      (2006.01)
*F01D 5/32*      (2006.01)
(Continued)

(52) U.S. Cl.
CPC ............ *F01D 5/303* (2013.01); *F01D 5/3038* (2013.01); *F01D 5/32* (2013.01); *F01D 9/042* (2013.01);
(Continued)

(58) Field of Classification Search
CPC ............ F05D 2220/32; F05D 2240/12; F05D 2250/11; F05D 2230/60; F01D 5/3038;
(Continued)

(56) References Cited

U.S. PATENT DOCUMENTS 2,277,484 A * 3/1942 Flanders ................. F01D 5/225
                                                                416/189
3,603,702 A * 9/1971 Jensen ................... F01D 5/3007
                                                                416/220 R
(Continued)

FOREIGN PATENT DOCUMENTS

DE    202016103137 U1 * 8/2016 ............. F01D 9/042
EP         1788198 A2 * 5/2007 ............. F01D 5/326
(Continued)

OTHER PUBLICATIONS

A Korean Office Action dated Mar. 22, 2019 in connection with Korean Patent Application No. 10-2018-0007903 which corresponds to the above-referenced U.S. application.

*Primary Examiner* — Courtney D Heinle
*Assistant Examiner* — Andrew Thanh Bui

(57) ABSTRACT

A vane ring assembly capable of preventing vibration of a vane, and wear damage caused thereby, by fixing the vane to a ring through a strong contact therebetween. The vane ring assembly includes a retaining ring having an inner peripheral surface in which a dovetail groove is formed; a vane including a dovetail inserted into the dovetail groove and an airfoil protruding from the dovetail in a radial direction of the retaining ring; and a locking key disposed between the dovetail and the dovetail groove and configured to press the dovetail into the dovetail groove. A method of assembling the vane ring assembly includes steps of inserting the dovetail into the dovetail groove; and forcibly pushing the locking key between the dovetail groove and the bottom surface of the dovetail.

9 Claims, 8 Drawing Sheets

(51) Int. Cl.
    *F02C 3/04*     (2006.01)
    *F01D 9/04*     (2006.01)

(52) U.S. Cl.
    CPC ............ *F02C 3/04* (2013.01); *F05D 2220/32* (2013.01); *F05D 2230/60* (2013.01); *F05D 2240/12* (2013.01); *F05D 2250/11* (2013.01)

(58) Field of Classification Search
    CPC . F01D 5/303; F01D 9/042; F01D 5/32; F02C 3/04
    See application file for complete search history.

(56) References Cited

U.S. PATENT DOCUMENTS

| | | | | |
|---|---|---|---|---|
| 3,966,353 | A * | 6/1976 | Booher, Jr. | F01D 9/042 415/115 |
| 5,224,825 | A * | 7/1993 | Strang | F01D 25/246 415/135 |
| 6,631,561 | B1 * | 10/2003 | Anding | F01D 5/18 29/889.72 |
| 6,981,847 | B2 * | 1/2006 | Arinci | F01D 5/3038 416/193 A |
| 8,708,641 | B2 * | 4/2014 | Ueda | F01D 5/16 415/1 |
| 8,920,116 | B2 * | 12/2014 | Wiebe | F01D 25/246 415/209.3 |
| 10,358,930 | B2 * | 7/2019 | Ju | F01D 5/3007 |
| 2012/0051923 | A1 * | 3/2012 | McDonald | F04D 29/542 416/219 R |

FOREIGN PATENT DOCUMENTS

| | | |
|---|---|---|
| JP | 2007-138944 A | 6/2007 |
| KR | 10-2015-0007348 A | 1/2015 |
| KR | 10-2015-0050472 A | 5/2015 |

* cited by examiner

[FIG. 1]
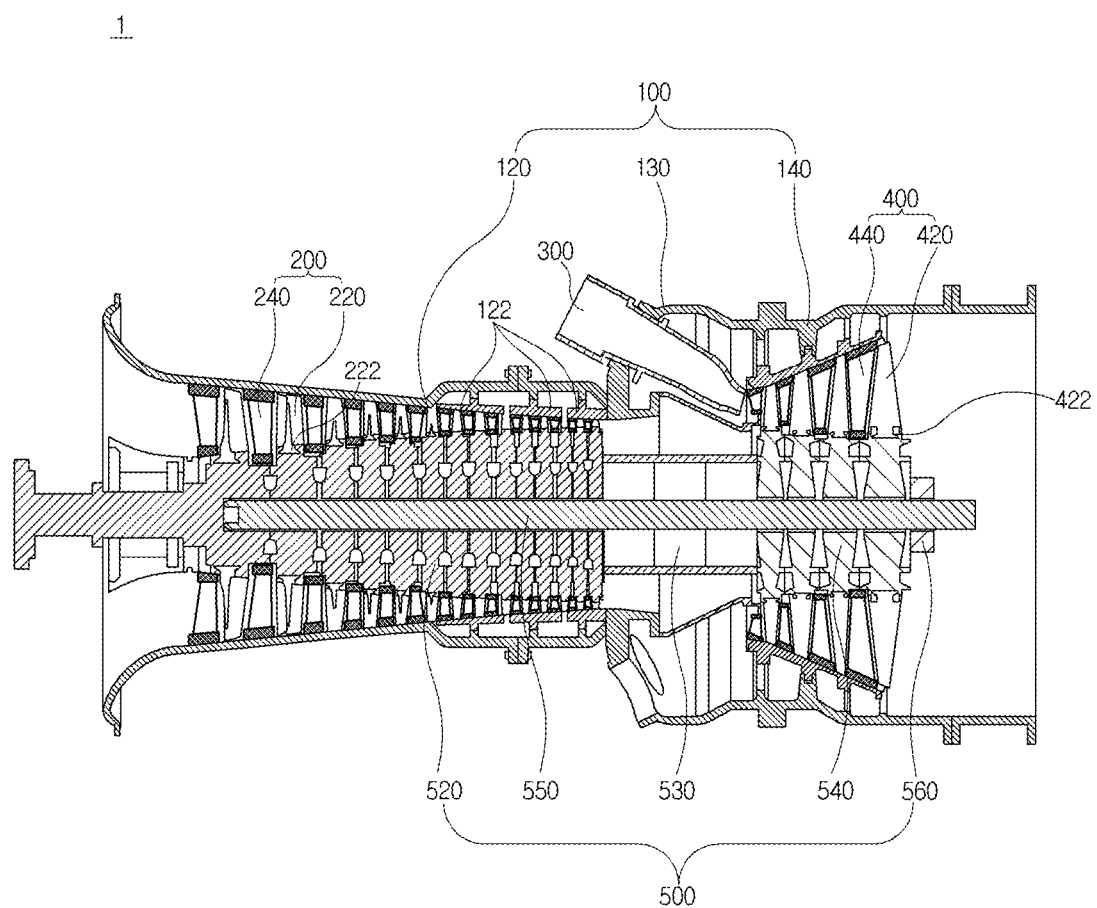

[FIG. 2]
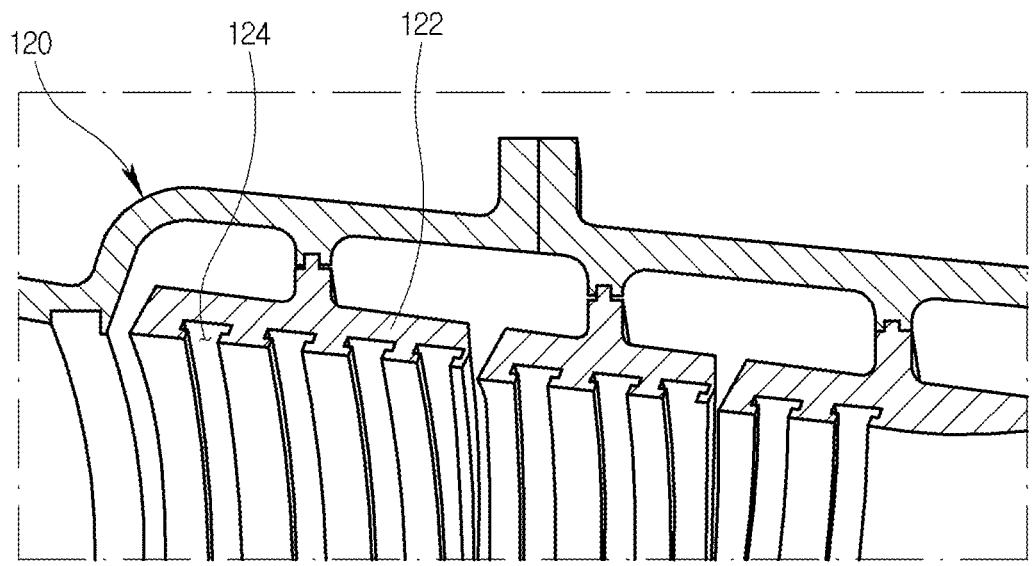
[FIG. 3]
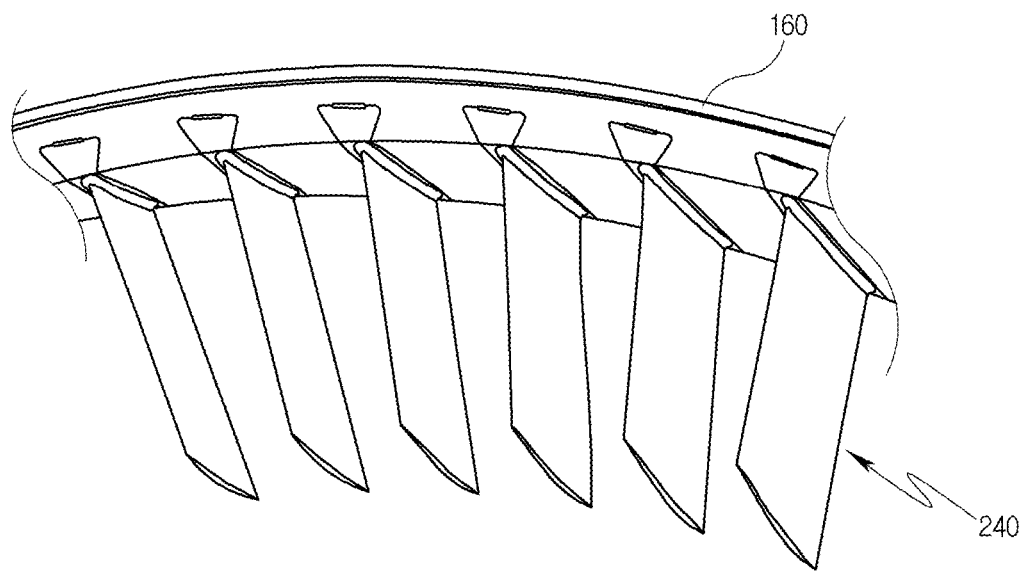

[FIG. 4]
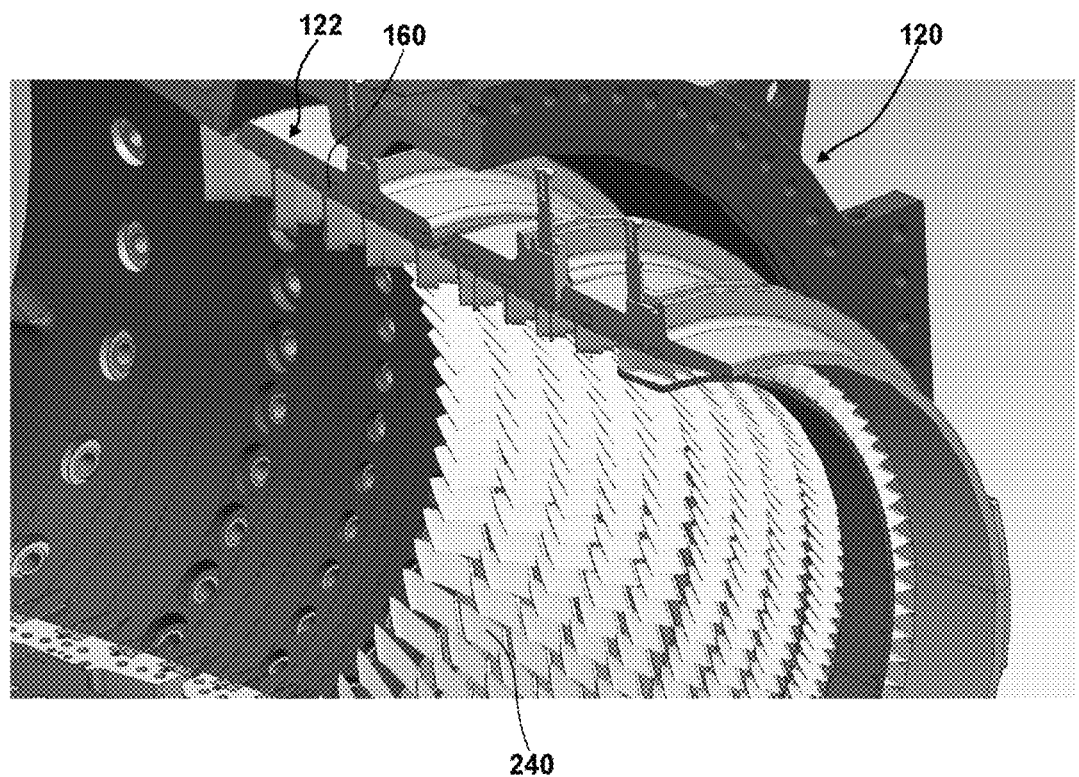

[FIG. 5]
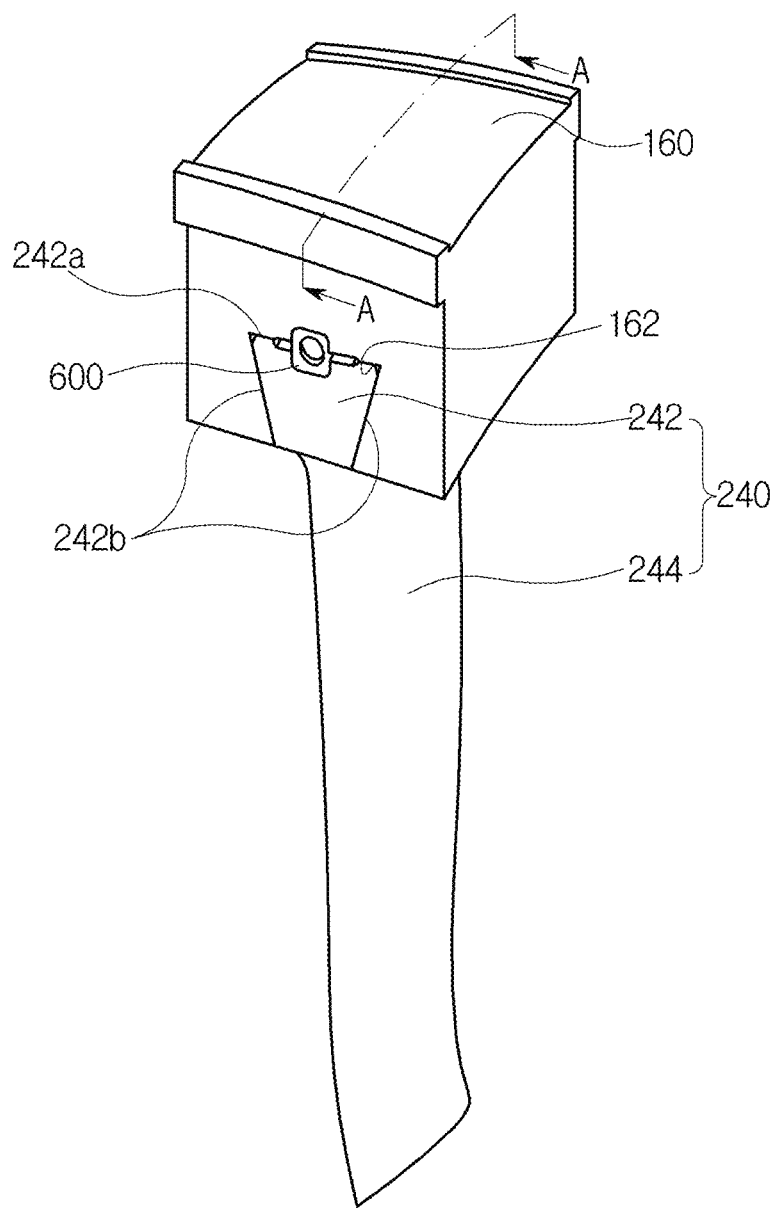

[FIG. 6]
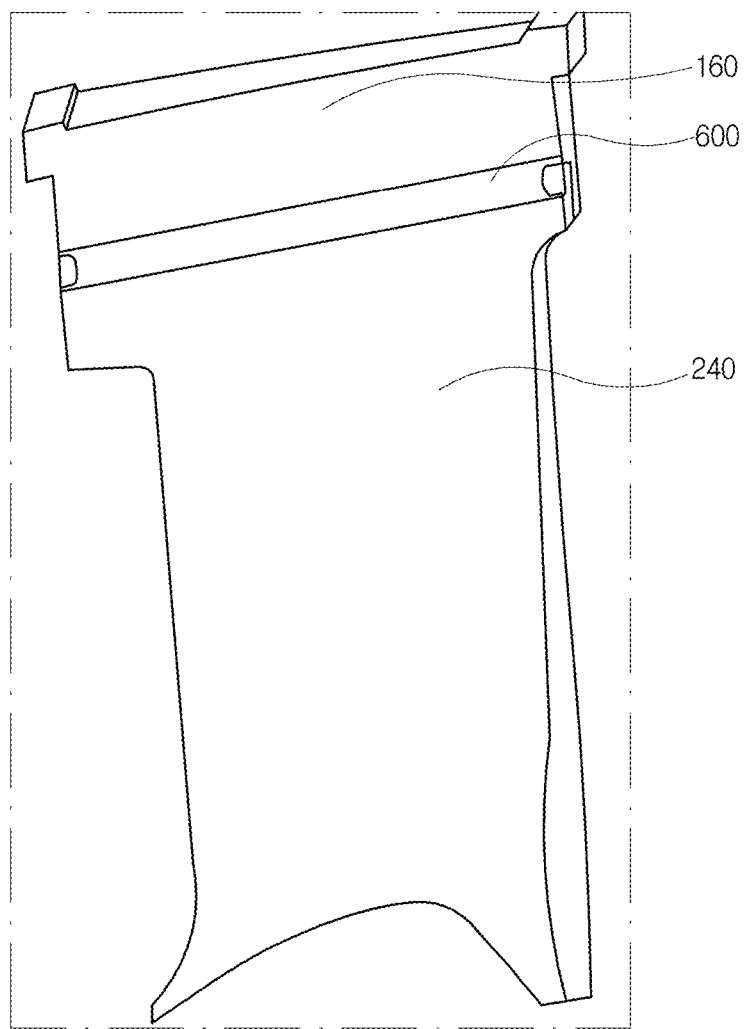

[FIG. 7]
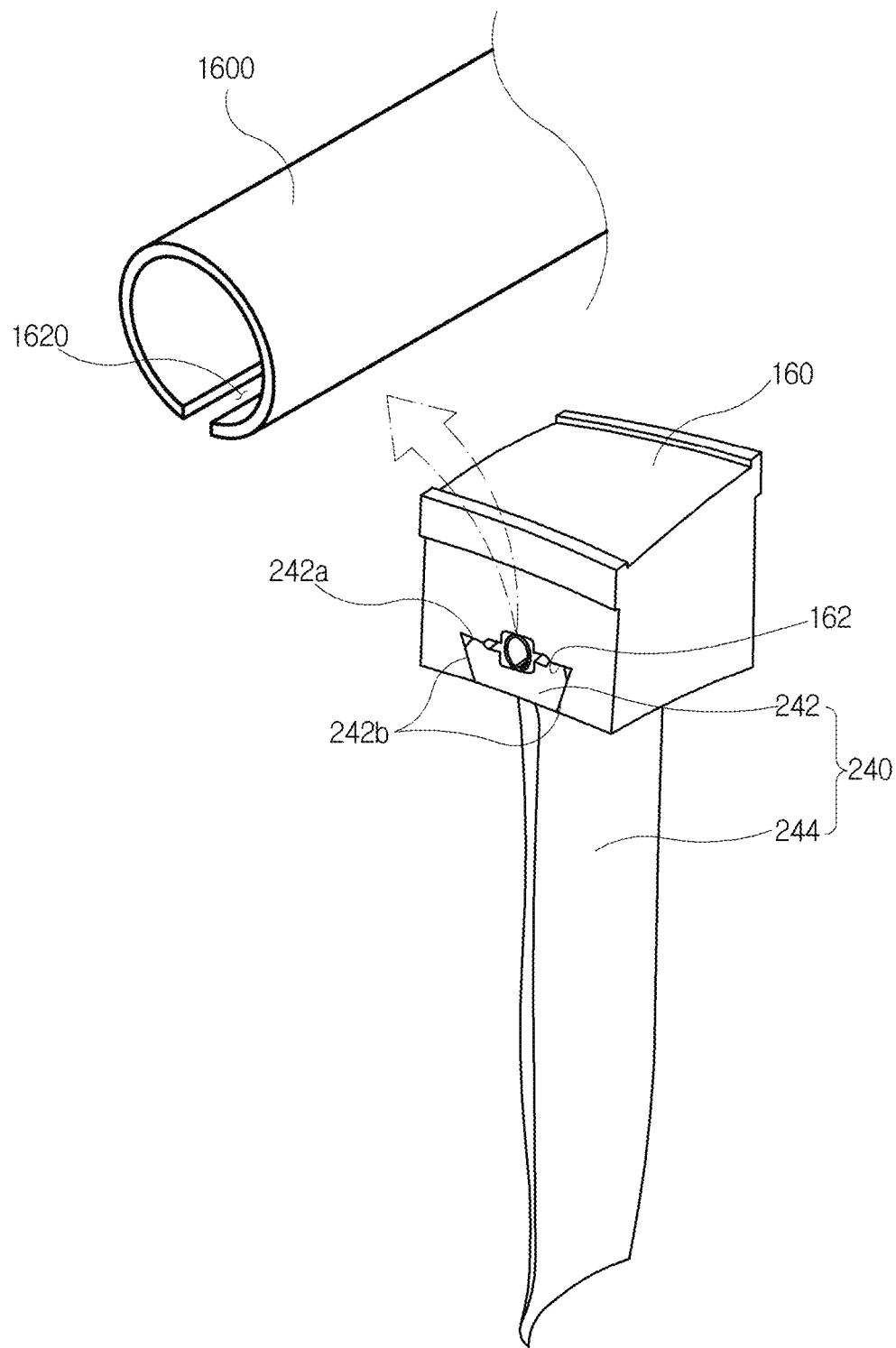

[FIG. 8]
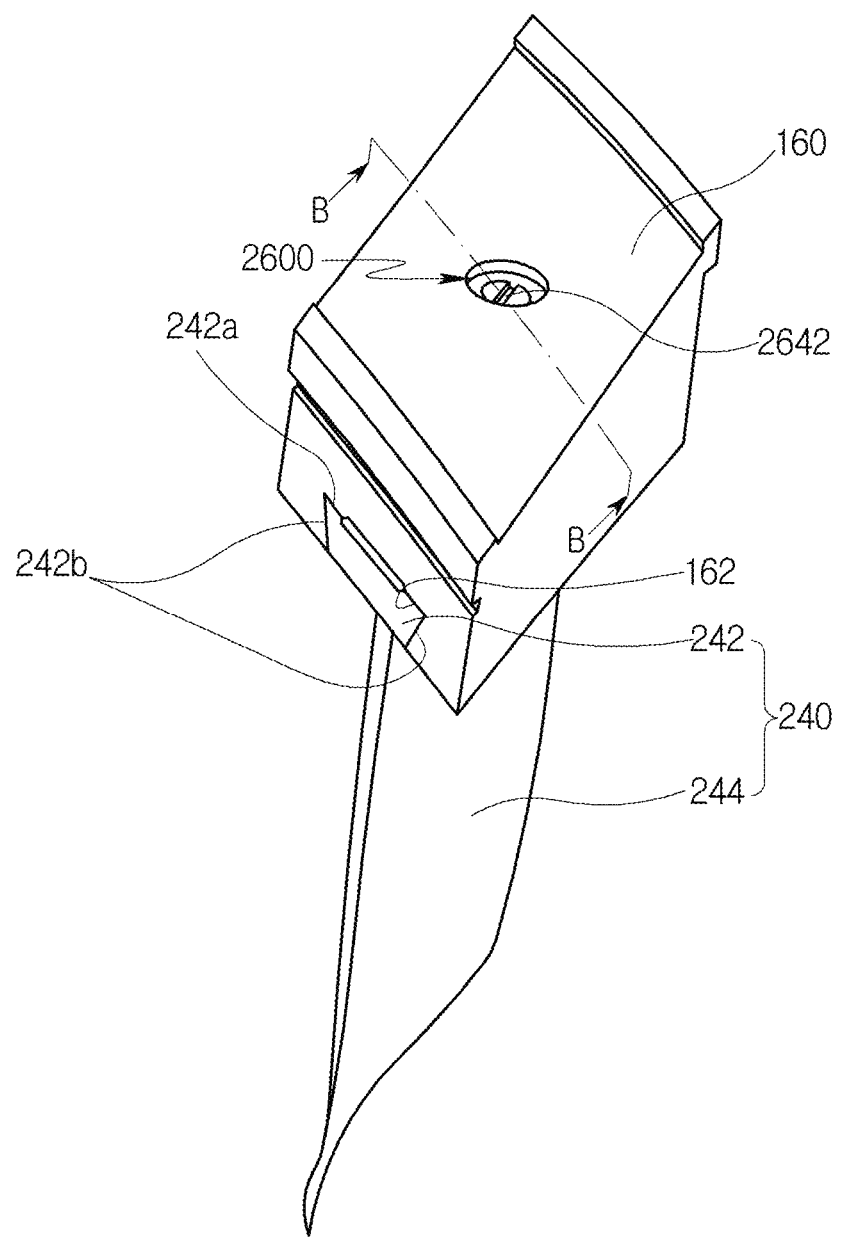

[FIG. 9]
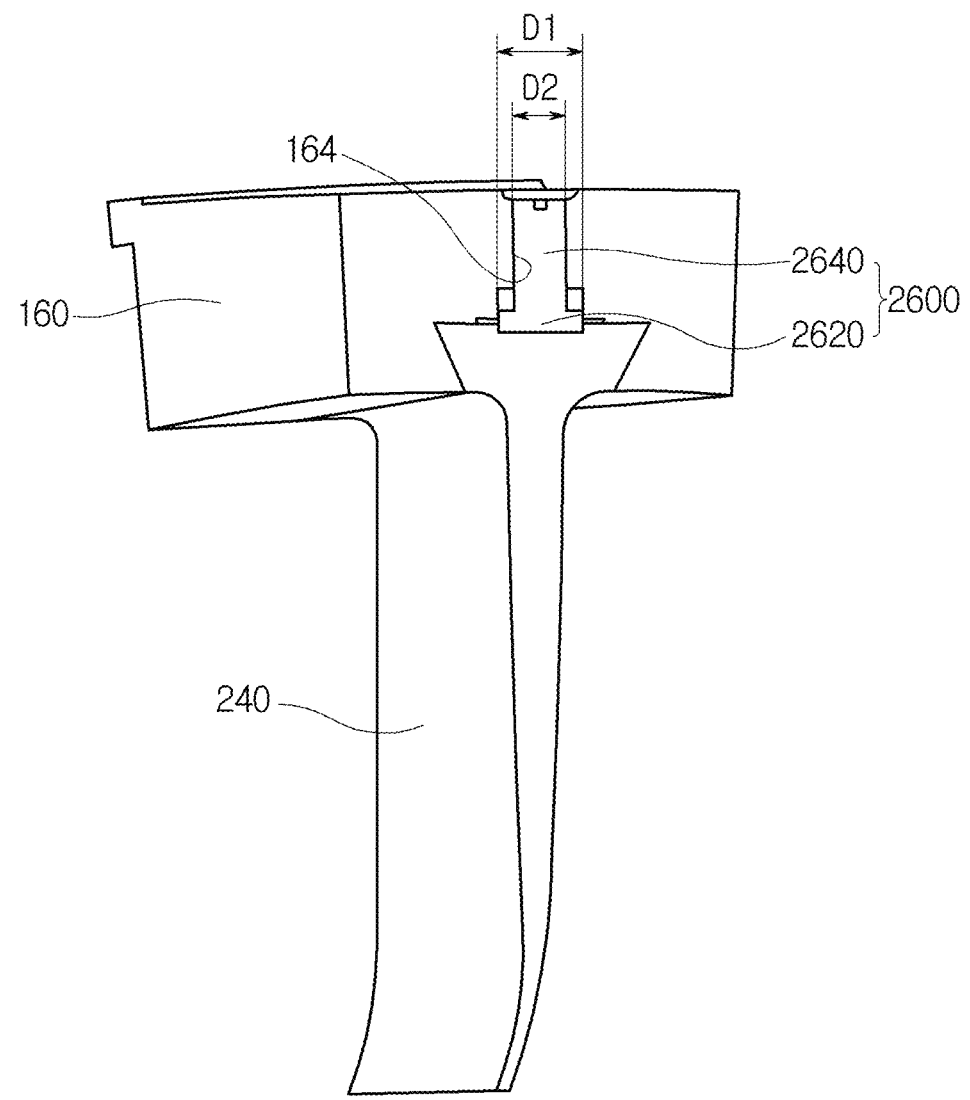

VANE RING ASSEMBLY, METHOD OF ASSEMBLING THE SAME, AND GAS TURBINE INCLUDING THE SAME

CROSS-REFERENCE TO RELATED APPLICATIONS

This application claims priority to Korean Patent Application No. 10-2018-0007903, filed on Jan. 22, 2018, the disclosure of which is incorporated herein by reference in its entirety.

BACKGROUND OF THE INVENTION

Field of the Invention

Exemplary embodiments of the present disclosure relate to a vane ring assembly, a method of assembling the same, and a gas turbine including the same, and more particularly, to a vane ring assembly capable of preventing vibration of a vane and wear damage caused by such vibration, by providing a strong point of contact for fixing the vane to a ring.

Description of the Related Art

In general, a turbine is a machine that converts the energy of a fluid such as water, gas, or steam into mechanical work, and is typically referred to as a turbomachine in which a plurality of buckets or blades are mounted to the circumference of a rotating body, which is rotated at high speed by an impulsive or reaction force generated from a flow of steam or gas. Examples of the turbine include a water turbine using the energy of elevated water, a steam turbine using the energy of steam, an air turbine using the energy of high-pressure compressed air, a gas turbine using the energy of high-temperature and high-pressure gas, and the like.

The gas turbine is generally a type of internal combustion engine that converts thermal energy into mechanical energy that rotates a turbine into which is injected combustion gas produced by mixing fuel with air compressed to a high pressure in a compressor and then burning the mixture. The gas turbine is advantageous in that consumption of lubricant is extremely low due to the absence of mutual friction parts such as the reciprocating mechanism of a piston-cylinder in a four-stroke engine. The gas turbine also enables high speed motion and a great reduction in amplitude, which is a characteristic of reciprocating machines.

The compressor includes an alternating arrangement of a plurality of compressor blades and a plurality of compressor vanes, which may be provided for each stage of a multistage compressor. The compressor blades rotate together with the rotor (rotary shaft) of the gas turbine, whereas the compressor vanes are installed in the casing of the compressor to align the flow of air introduced into the compressor blades. Thus, the compressor vanes may serve to change a direction of air flow to introduce air into the compressor blades at an appropriate angle, and to minimize a vortex of air flow.

However, the compressor vanes are subject to vibration due to the fluid flow caused by rotation of the blades adjacent to the vanes and are further subject to vibration transmitted through the compressor casing. Such vibrations cause wear on the compressor vanes.

In particular, there is a problem in that wear damage occurs in a portion of the compressor casing where the compressor vanes are installed in the compressor casing, and particularly to a vain retaining ring connected to the compressor casing, thereby weakening the coupling force therebetween.

SUMMARY OF THE INVENTION

The present disclosure has been made in view of the above-mentioned problems. It is an object of the present disclosure to provide a vane ring assembly capable of preventing vibration of a vane, and preventing wear damage caused thereby, by providing a strong point of contact for fixing the vane to a ring. It is a further object of the present disclosure to provide a method of assembling the vane ring assembly and a gas turbine including the vane ring assembly.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

To accomplish the above object, an aspect of the present disclosure provides a vane ring assembly including a retaining ring having an inner peripheral surface in which a dovetail groove is formed; a vane including a dovetail inserted into the dovetail groove and an airfoil protruding from the dovetail in a radial direction of the retaining ring; and a locking key disposed between the dovetail and the dovetail groove and configured to press the dovetail into the dovetail groove.

The dovetail may include a bottom surface facing away from the airfoil; and tapered surfaces that are formed on opposite sides of the dovetail and are each inclined in an opposing direction to gradually reduce the distance between the tapered surfaces, the tapered surfaces extending toward the airfoil from the bottom surface. The locking key is provided between the bottom surface and the dovetail groove.

The locking key may extend in a direction in which the vane is inserted into the retaining ring and may have a length substantially equal to a length of an axial length of the retaining ring. The locking key may be made of an elastic material, with a square cross-section, a tapered surface widened inward from the radial outer side of the ring, or a C-shaped cross section.

The locking key may include a first locking portion coming into contact with the dovetail; and a second locking portion extending in the radial direction of the retaining ring from the first locking portion so as to pass through the retaining ring. The first locking portion may have a diameter (D1) larger than a diameter (D2) of the second locking portion. The second locking portion may have a thread formed on its outer peripheral surface. The second locking portion may have an insertion groove formed at one end for insertion of a tool for rotating the second locking portion. The locking key may be inserted outward from an inner side of the retaining ring. The retaining ring may have a through-hole formed from a bottom surface of the dovetail groove to an outer surface of the retaining ring. The locking key may be caulked. The first and second locking portions may be formed integrally with each other.

To accomplish the above object, another aspect of the present disclosure provides a method of assembling the vane ring assembly. The method may include inserting the dovetail into the dovetail groove; and forcibly pushing the locking key between the dovetail groove and the bottom surface of the dovetail. The method may further include securing a space between the dovetail groove and the bottom surface of the dovetail, by fixing a position of the dovetail using a jig configured to simultaneously hold the dovetail and the retaining ring.

To accomplish the above object, a further aspect of the present disclosure provides a gas turbine comprising a compressor to suck and compress air to a high pressure, the compressor accommodated in a compressor casing; a combustor to produce combustion gas by mixing the compressed air with fuel for combustion; and a turbine to rotate a turbine blade using the combustion gas and generate power. The compressor may include a vane ring assembly circumferentially fitted into one of the compressor casing or a vane carrier installed in the compressor casing, wherein the vane ring assembly is consistent with the above vane ring assembly.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cross-sectional view schematically illustrating a gas turbine in which may be applied a vane ring assembly according to an embodiment of the present disclosure;

FIG. 2 is a perspective view of a compressor casing and a vane carrier in the gas turbine of FIG. 1, for illustrating a separation between the compressor casing and vane carrier;

FIG. 3 is a perspective view illustrating a vane ring assembly according to a first embodiment of the present disclosure;

FIG. 4 is a perspective view illustrating a state in which the vane ring assembly of FIG. 3 is coupled to the vane carrier of FIG. 2;

FIG. 5 is a perspective view of a vane of the embodiment of FIG. 3;

FIG. 6 is a cross-sectional view taken along line A-A of FIG. 5;

FIG. 7 is a perspective view of the vane of a vane ring assembly according to a second embodiment of the present disclosure;

FIG. 8 is a perspective view of the vane of a vane ring assembly according to a third embodiment of the present disclosure; and FIG. 9 is a cross-sectional view taken along line B-B of FIG. 8.

DESCRIPTION OF SPECIFIC EMBODIMENTS

Hereinafter, a vane ring assembly, a method of assembling the same, and a gas turbine including the same according to exemplary embodiments of the present disclosure will be described in more detail with reference to the accompanying drawings.

In addition, the terms used in the specification are terms defined in consideration of functions of the present disclosure, and these terms may vary with the intention or practice of a user or an operator. The following embodiments are not intended to limit the spirit and scope of the disclosure but are merely for the purpose of describing the components set forth in the appended claims.

For clear explanation of the present disclosure, parts irrelevant to the description may be omitted in the drawings, and like reference numerals refer to like parts throughout the specification. In the whole specification, it will be understood that when a component is referred to as "comprising or including" any component, it does not exclude other components, but can further comprise or include the other components unless otherwise specified.

Hereinafter, a gas turbine 1 according to an embodiment of the present disclosure will be described with reference to FIGS. 1 to 4.

Referring to FIG. 1, the gas turbine 1 may largely include a casing 100, a compressor 200 that sucks and compresses air to a high pressure, a combustor 300 that mixes the air compressed by the compressor 200 with fuel for combustion, and a turbine 400 that rotates a plurality of turbine blades using the high-temperature and high-pressure combustion gas discharged from the combustor 300 to produce electric power.

The casing 100 may include a compressor casing 120 for accommodating the compressor 200, a combustor casing 130 for accommodating the combustor 300, and a turbine casing 140 for accommodating the turbine 400. Here, the compressor casing 120, the combustor casing 130, and the turbine casing 140 may be sequentially arranged in the casing 100 from the upstream side to the downstream side in terms of the flow direction of fluid. Thus, a diffuser may be provided downstream of the casing 100 to discharge the combustion gas having passed through the turbine 400.

A rotor (center shaft) 500 may be rotatably provided in the casing 100 and may be coupled with a generator (not shown) for power generation. The rotor 500 may include a compressor rotor disk 520 that is accommodated in the compressor casing 120; a turbine rotor disk 540 that is accommodated in the turbine casing 140; a torque tube 530 that is accommodated in the combustor casing 130 and connects the compressor rotor disk 520 to the turbine rotor disk 540; and a tie rod 550 and a fixing nut 560 that fasten the compressor rotor disk 520, the torque tube 530, and the turbine rotor disk 540 to each other.

The compressor rotor disk 520 may consist of a plurality of compressor rotor disks (for example, fourteen) arranged in the axial direction of the rotor 500. That is, the compressor rotor disks 520 may be formed in a multistage manner. Each compressor rotor disk 520 may have a substantially disk shape having an outer peripheral portion in which may be formed a compressor blade coupling slot for receiving a compressor blade 220 to be described later.

The turbine rotor disk 540 may be formed similar to the compressor rotor disk 520. That is, the turbine rotor disk 540 may consist of a plurality of turbine rotor disks arranged in the axial direction of the rotor 500, and the turbine rotor disks 540 may be formed in a multistage manner. Each turbine rotor disk 540 may have a substantially disk shape having outer peripheral portion in which may be formed a turbine blade coupling slot for receiving a turbine blade 420 to be described later.

The torque tube 530 is a torque transmission member that transmits the rotational force of the turbine rotor disk 540 to the compressor rotor disk 520. One end of the torque tube 530 may be fastened to the farthest downstream disk among the plurality of compressor rotor disks 520, and the other end of the torque tube 530 may be fastened to the farthest upstream disk among the plurality of turbine rotor disks 540. Here, a protrusion may be formed at each end of the torque tube 530 to engage with a groove provided to each of the compressor rotor disk 520 and the turbine rotor disk 540.

Thus, it is possible to prevent the torque tube 530 from rotating relative to the compressor rotor disk 520 and the turbine rotor disk 540. The torque tube 530 may have a hollow cylindrical shape such that the air supplied from the compressor 200 flows to the turbine 400 through the torque tube 530. The torque tube 530 may be formed to be resistant to deformation and distortion due to the characteristics of the gas turbine that continues to operate for a long time, and may be easily assembled and disassembled for easy maintenance.

The tie rod 550 may be formed to pass through the plurality of compressor rotor disks 520, the torque tube 530, and the plurality of turbine rotor disks 540 and may protrude from the last (farthest downstream) turbine rotor disk 540. One end of the tie rod 550 may be fastened to the farthest upstream compressor rotor disk 530, and the other end is fastened to the fixing nut 560. Here, the fixing nut 560 presses the farthest downstream turbine rotor disk 540 toward the compressor 200 to reduce the distance between the farthest upstream compressor rotor disk 520 and the farthest downstream turbine rotor disk 540. Thus, the plurality of compressor rotor disks 520, the torque tube 530, and the plurality of turbine rotor disks 540 may be compressed in the axial direction of the rotor 500. Therefore, it is possible to prevent the axial movement and relative rotation of the plurality of compressor rotor disks 520, the torque tube 530, and the plurality of turbine rotor disks 540. Through such a configuration, the rotor 500 may be rotatably supported at both ends by bearings, with one end coupled to the drive shaft of the generator.

Although one tie rod is formed to pass through the centers of the plurality of compressor rotor disks, the torque tube, and the plurality of turbine rotor disks in the present embodiment, the present disclosure is not limited to this. That is, a separate tie rod may be provided in each of the compressor and the turbine, a plurality of tie rods may be arranged circumferentially and radially, or a combination of these configurations may be used.

The compressor 200 may include a compressor blade 220 that rotates together with the rotor 500, and a compressor vane 240 that is installed in the compressor casing 120 to align the flow of air introduced into the compressor blade 220. The compressor blade 220 may consist of a plurality of compressor blades arranged in a multistage manner in the axial direction of the rotor 500, and for each stage, the plurality of compressor blades 220 may protrude radially and be arranged circumferentially, that is, in the direction of rotation of the rotor 500.

To this end, a root 222 of the compressor blade 220 may be coupled to the compressor blade coupling slot of the compressor rotor disk 520, and the root 222 may have a fir-tree shape to prevent the decoupling of the compressor blade 220 from the compressor blade coupling slot in the radial direction of the rotor 500. Thus, the compressor blade coupling slot may also have a fir-tree shape so as to correspond to the root 222 of the compressor blade.

Although the compressor blade root 222 and the compressor blade coupling slot have the fir-tree shape in the present embodiment, the present disclosure is not limited to this. For example, the compressor blade and the compressor rotor disk may have a dovetail shape, or may be fastened to each other using a fixture such as a key or a bolt.

Here, the compressor rotor disk 520 and the compressor blade 220 are typically coupled to each other in a tangential-type or axial-type manner. In the present embodiment, the compressor blade root part 222 is inserted into the compressor blade coupling slot in the axial direction of the rotor 500 in the so-called axial-type manner, as described above. Thus, the compressor blade coupling slot according to the present embodiment may consist of a plurality of compressor blade coupling slots arranged radially in the circumferential direction of the compressor rotor disk 520.

The compressor vane 240 may consist of a plurality of compressor vanes arranged in a multistage manner in the axial direction of the rotor 500. Here, the compressor vane 240 and the compressor blade 220 may be arranged alternately in the flow direction of air. In this case, the compressor vane 240 is disposed such that its radial inner end is spaced apart from the compressor rotor disk 520 by a predetermined distance. For each stage, the plurality of compressor vanes 240 may protrude radially and be arranged circumferentially, that is, in the direction of rotation of the rotor 500.

The turbine 400 may be formed similar to the compressor 200. That is, the turbine 400 may include a turbine blade 420 that rotates together with the rotor 500, and a turbine vane 440 that is fixedly installed in the turbine casing 140 to align the flow of air introduced into the turbine blade 420. The turbine blade 420 may consist of a plurality of turbine blades arranged in a multistage manner in the axial direction of the rotor 500, and for each stage the plurality of turbine blades 420 may protrude radially and be arranged circumferentially, that is, in the direction of rotation of the rotor 500. Further, a root 422 of the turbine blade 420 may be coupled to the turbine blade coupling slot of the turbine rotor disk 540, and the root 422 may have a fir-tree shape to prevent the decoupling of the turbine blade 420 from the turbine blade coupling slot in the radial direction of the rotor 500.

Although described in terms of the compressor vanes 240 of the compressor 200 of the turbine 1, the present disclosure may be applied to the structure of the turbine vanes 440 of the turbine 400, which is similar to that of the compressor vanes 240.

Specifically, in the structure in which the plurality of compressor vanes 240 are installed in the compressor casing 120, a vane carrier 122 may be installed in the compressor casing 120 so as to be spaced apart from the inner peripheral surface of the casing 120 by a predetermined distance, as illustrated in FIG. 2.

In this case, a ring groove 124 for coupling of a vane ring assembly in which the plurality of compressor vanes 240 are coupled to a retaining ring 160 may be formed in the compressor casing 120 or on the inner peripheral surface of the vane carrier 122, as illustrated in FIG. 3.

The ring groove 124 may extend in the circumferential direction of the compressor casing 120, so that the vane ring assembly may be circumferentially fitted into the ring groove 124, as illustrated in FIG. 4.

The combustor 300 may mix the air introduced from the compressor 200 with fuel and burn a mixture thereof to produce high-temperature and high-pressure combustion gas with high energy. The combustor 300 may increase the temperature of the combustion gas to a temperature at which the combustor and the turbine are able to be resistant to heat in a constant-pressure combustion process.

Specifically, the combustor 300 may consist of a plurality of combustors arranged in the direction of rotation of the rotor 500 in the combustor casing.

Each of the combustors 300 may include a liner into which the air compressed by the compressor 200 is introduced, a burner that injects fuel into the air introduced into the liner for combustion, and a transition piece that guides the combustion gas produced by the burner to the turbine.

The liner may include a flame container that defines a combustion chamber, and a flow sleeve that surrounds the flame container and defines an annular space.

The burner may include a fuel injection nozzle that is formed at the front end of the liner to inject fuel into the air introduced into the combustion chamber, and an ignition plug that is formed on the wall of the liner to ignite air and fuel mixed in the combustion chamber.

The transition piece may be configured such that the outer wall thereof is cooled by the air supplied from the compressor to prevent the transition piece from being damaged due to the high temperature of combustion gas.

That is, the transition piece may have a cooling hole formed for injection of air thereinto, and the main body therein may be cooled by the air introduced through the cooling hole.

Meanwhile, the air used to cool the transition piece may flow into the annular space of the liner, and may impinge on cooling air supplied through the cooling hole formed in the flow sleeve from the outside of the flow sleeve in the outer wall of the liner.

Although not separately illustrated in the drawings, a deswirler serving as a guide vane may be formed between the compressor 200 and the combustor 300 to adapt the angle of flow of air, introduced into the combustor 300, to a design angle of flow.

The turbine 400 may be formed similar to the compressor 200. That is, the turbine 400 may include a turbine blade 420 that rotates together with the rotor 500, and a turbine vane 440 that is fixedly installed in the turbine casing 140 to align the flow of air introduced into the turbine blade 420.

The turbine blade 420 may consist of a plurality of turbine blades arranged in a multistage manner in the axial direction of the rotor 500, and the plurality of turbine blades 420 may be formed radially in the direction of rotation of the rotor 500 for each stage.

That is, a root 422 of the turbine blade 420 may be coupled to the turbine blade coupling slot of the turbine rotor disk 540, and the root 422 may have a fir-tree shape to prevent the decoupling of the turbine blade 420 from the turbine blade coupling slot in the radial direction of the rotor 500.

In this case, the turbine blade coupling slot may also have a fir-tree shape so as to correspond to the root 422 of the turbine blade.

Although the turbine blade root 422 and the turbine blade coupling slot have the fir-tree shape in the present embodiment, the present disclosure is not limited thereto. For example, they may also have a dovetail shape. In addition, the turbine blade may be fastened to the turbine rotor disk using a fastener other than the above form, for example using a fixture such as a key or a bolt.

Here, the turbine rotor disk 540 and the turbine blade 420 are typically coupled to each other in a tangential-type or axial-type manner. In the present embodiment, the turbine blade root part 422 is inserted into the turbine blade coupling slot in the axial direction of the rotor 500 in the so-called axial-type manner, as described above. Thus, the turbine blade coupling slot according to the present embodiment may consist of a plurality of turbine blade coupling slots arranged radially in the circumferential direction of the turbine rotor disk 540.

The turbine vane 440 may consist of a plurality of compressor vanes arranged in a multistage manner in the axial direction of the rotor 500. Here, the turbine vane 440 and the turbine blade 420 may be arranged alternately in the flow direction of air.

In addition, the plurality of turbine vanes 440 may be formed radially in the direction of rotation of the rotor 500 for each stage.

Since the turbine 400 comes into contact with high-temperature and high-pressure combustion gas unlike the compressor 200, there is a need for a cooling means for preventing damage such as deterioration.

Thus, the gas turbine according to the present embodiment may further include a cooling passage through which the compressed air is bled from a partial position of the compressor 200 to be supplied to the turbine 400.

The cooling passage may extend from the outside of the casing 100 (external passage), may extend through the inside of the rotor 500 (internal passage), or may use both of the external passage and the internal passage.

In this case, the cooling passage may communicate with a turbine blade cooling passage formed in the turbine blade 420 such that the turbine blade 420 is cooled by cooling air.

The turbine blade cooling passage may communicate with a turbine blade film cooling hole formed in the surface of the turbine blade 420 so that cooling air is supplied to the surface of the turbine blade 420, thereby enabling the turbine blade 420 to be cooled by the cooling air in a so-called film cooling manner.

Besides, the turbine vane 440 may also be cooled by the cooling air supplied from the cooling passage, similar to the turbine blade 420.

In the gas turbine 1 having such a configuration, the air introduced into the casing 100 may be compressed by the compressor 200, the air compressed by the compressor may be mixed with fuel for combustion and then converted into combustion gas by the combustor 300, the combustion gas produced by the combustor may be introduced into the turbine 400, the combustion gas introduced into the turbine 400 may rotate the rotor 500 through the turbine blade 420 and then be discharged to the atmosphere through the diffuser, and the rotor 500 rotated by the combustion gas may drive the compressor 200 and the generator. That is, some of the mechanical energy obtained from the turbine may be supplied as energy required for compression of air in the compressor, and the remainder may be used to produce electric power by the generator.

The gas turbine is given merely by way of example, and the vane ring assembly of the present disclosure, which will be described in detail below, is applicable to all of typical gas turbines.

Hereinafter, a vane ring assembly according to a first embodiment of the present disclosure will be described in detail with reference to FIGS. 3, 5, and 6.

The vane ring assembly according to the first embodiment of the present disclosure may largely include a retaining ring 160, a compressor vane 240 fastened to the inner peripheral surface of the ring 160, and a locking key 600. The retaining ring 160 may have a cross-sectional shape corresponding to the shape of a ring groove 124 so as to be fitted into the ring groove 124, and may have an inner peripheral surface in which a dovetail groove 162 is formed. Here, the dovetail groove 162 may consist of a plurality of dovetail grooves 162, which are spaced circumferentially around the inner peripheral surface of the retaining ring 160. Also, the compressor vane 240 may consist of a plurality of compressor vanes 240 respectively fastened to the inner peripheral surface of the ring 160, and the locking key 600 may consist of a plurality of locking keys 600 to include one locking key 600 for each combination of a compressor vane 240 and a dovetail groove 162.

Each of the compressor vanes 240 may include a dovetail 242 fastened to an associated one of the dovetail grooves 162, and an airfoil 244 protruding from the dovetail 242 in the radial direction of the ring 160.

In this case, the dovetail 242 may include a bottom surface 242a facing away from the airfoil 244, and tapered surfaces 242b that are formed on opposite sides of the dovetail 242 and are each inclined in a direction opposite to the other to thereby gradually reduce the distance (width) between the tapered surfaces 242b. The tapered surfaces 242b are planar and extend toward the airfoil 244 from the bottom surface 242a. Thus, the dovetail 242 of the vane may be fitted into the dovetail groove 162 of the retaining ring 160 in the axial direction of the rotor 500.

However, the present disclosure is not limited to this dovetail shape. For example, the dovetail may have any shape as long as it protrudes in the circumferential direction of the ring 160 to be fitted into the dovetail groove of the ring and then fixed so as not to be decoupled in the radial direction of the ring 160.

Each locking key 600 serves to press a dovetail 242 of the vane into the corresponding dovetail groove 162, and may be disposed between the dovetail 242 and the dovetail groove 162, specifically between the bottom surface 242a of the dovetail and the dovetail groove 162 arranged in opposition to the dovetail. In this case, the bottom surface 242a of the dovetail and the opposing dovetail groove 162 may each have a key groove for insertion of the locking key 600.

In the present embodiment, the locking key 600 is a member inserted between the bottom surface 242a and the dovetail groove 162, and may extend in a direction in which the compressor vane 240 is inserted into the ring 160. In this case, the locking key 600 may be formed as a single, unified member and may extend the full length of the ring 160 in the axial direction. Thus, as illustrated in FIG. 6, the locking key 600 may have the same length as the axial length of the ring 160.

However, the present disclosure is not limited to the above configuration of the locking key 600. For example, two locking keys 600 may also be respectively inserted into opposite sides of the ring 160, in which case the length of each of the two locking keys 600 may be one half (or less) of the axial length of the ring 160.

The locking key 600 is preferably made of an elastic material. Thus, the locking key 600 may be compressed when inserted between the dovetail 242 and the dovetail groove 162, thereby enabling the dovetail 242 to be pressed into and positioned in the dovetail groove 162 by elastic force. Specifically, the dovetail may be tightly fixed by pressing both tapered surfaces 242b in the direction of the airfoil 244 to become wedged against corresponding surfaces of the dovetail groove 162. In doing so, in addition to securely fixing the compressor vane 240 to the retaining ring 160, it is possible to obtain an effect of damping the vibration of the compressor vane 240.

Although the locking key 600 may have a square cross-section in the present embodiment, the present disclosure is not limited to this. For example, the locking key may have a tapered surface widened inward from the radial outer side of the ring 160 to enlarge the contact area with the bottom surface 242a.

In addition, a rigid center rod may be inserted into the center of the locking key 600.

According to the present disclosure, it is possible to prevent the vibration of the compressor vane 240 by strongly pressing and fixing the compressor vane 240 to the ring 160, namely through strong contact between the contact surfaces of the dovetail 242 of the vane and the dovetail groove 162 of the ring such that the dovetail 242 does not move in the dovetail groove 162.

Thus, it is possible to prevent the wear damage of the compressor vane 240 and to prevent the coupling force with the ring 160 from weakening.

Next, a vane ring assembly according to a second embodiment of the present disclosure will be described in detail with reference to FIG. 7. Since the vane ring assembly of the second embodiment is identical to that of the first embodiment except for the shape of the locking key, only different components will be described.

In the present embodiment, a locking key 1600 is formed to have a largely ring-shaped cross section in which a lengthwise opening 1620 is formed at one side. In other words, the locking key 1600 has a C-shaped cross section. That is, as illustrated in FIG. 7, the locking key 1600 has a round shape in which ends of the C-shape do not touch each other.

Thus, the locking key 1600 may be compressed and held, and then inserted between the dovetail 242 and the dovetail groove 162, that is, while the shape of the locking key 1600 is deformed. Therefore, the same effects as the first embodiment can be obtained.

Moreover, unlike the locking key 600 of the first embodiment, the locking key 1600 has a space defined through its center, so that the shape of the locking key 1600 is easily deformed. Since its shape is easily deformed, the locking key 600 is advantageous in that it may be used in the vane ring assembly having various sizes and shapes.

Hereinafter, a method of assembling the vane ring assembly according to the first and second embodiments will be described.

After the dovetail 242 of the compressor vane is inserted into the dovetail groove 162, the locking key may be forcibly pushed between the dovetail groove 162 and the bottom surface 242a of the dovetail.

In this case, the forcibly pushing the locking key may be performed in the state in which the inserted position of the dovetail 242 into the dovetail groove 162 is fixed by a separate jig.

That is, although not illustrated in the drawings, the locking key may be pushed in the state in which a space for pushing the locking key between the bottom surface 242a of the dovetail and the dovetail groove 162 is secured and the position of the dovetail 242 is fixed by a separate jig that simultaneously holds the dovetail 242 and the ring 160.

As described above, after the vane ring assembly is assembled by coupling the plurality of compressor vanes 240 into the dovetail grooves 162 of the ring 160 and fixing the dovetails 242 to the dovetail grooves 162 through the strong contact therebetween, the vane ring assembly is fitted into the ring groove 124 of the vane carrier 122.

To this end, the compressor casing 120 may be configured such that it is divided into two halves coupled to each other, and the retaining ring 160 may also have a structure in which after it is divided into two halves that are circumferentially fitted into the ring grooves 124 of the respective divided compressor casings 120, they are coupled to each other as a whole.

Next, a vane ring assembly according to a third embodiment of the present disclosure will be described in detail with reference to FIGS. 8 and 9.

The vane ring assembly according to the third embodiment of the present disclosure may largely include a retaining ring 160, a plurality of compressor vanes 240 fastened to the inner peripheral surface of the ring 160, and a plurality of locking keys 2600.

The ring 160 may have a plurality of dovetail grooves 162 spaced circumferentially on the inner peripheral surface thereof. Moreover, the ring 160 has through-holes 164 formed to pass through the ring 160, from a bottom surface of the dovetail grooves 162 toward an outer surface of the ring 160. In this case, the through-holes 164 may be formed corresponding to the shapes of the locking keys 2600.

Each of the compressor vanes 240 may include a dovetail 242 fastened to an associated one of the dovetail grooves 162, and an airfoil 244 protruding in the radial direction of the ring 160 from the dovetail 242. As in the first embodiment, the dovetail 242 may include a bottom surface 242a facing away from the airfoil 244, and tapered surfaces 242b that are formed on opposite sides of the dovetail 242 and are each inclined in a direction opposite to the other to thereby gradually reduce the distance (width) between the tapered surfaces 242b, which are planar and extend toward the airfoil 244 from the bottom surface 242a. Thus, the dovetail 242 of the vane may be fitted into the dovetail groove 162 of the ring in the axial direction of the rotor 500.

Each locking key 2600 serves to press a dovetail 242 of the vane into a corresponding dovetail groove 162, and may be provided between the dovetail 242 and the dovetail groove 162.

Specifically, the locking key 2600 includes a first locking portion 2620 coming into contact with the dovetail 242, and a second locking portion 2640 extending in the radial direction of the ring from the first locking portion 2620 to pass through the ring 160.

The first and second locking portions 2620 and 2640 may be formed integrally with each other, and are both formed in a cylindrical shape. It is preferable that the diameter D1 of the first locking portion is larger than the diameter D2 of the second locking portion.

Therefore, the contact surface of the first locking portion 2620 with the dovetail 242 may be wider and the dovetail 242 may come into strong contact with the dovetail groove 162. In addition, it is possible to prevent the decoupling of the locking key 2600 outward of the ring 160.

Since the diameter of the first locking portion 2620 is larger than the diameter of the second locking portion 2640 as described above, the locking key 2600 is inserted from the inner side of the ring 160 to its outer side. This will be described in detail in the following assembly method.

In this case, the outer peripheral surface of the second locking portion 2640 may be threaded so that the second locking portion 2640 may be screwed to the associated through-hole 164 of the ring.

In addition, the second locking portion 2640 has an insertion groove 2642 formed at one end for insertion of a tool (e.g., a screwdriver) for rotating the second locking portion. The second locking portion 2640 may be rotated at the time of coupling the second locking portion 2640 or pressing the dovetail 242 by inserting the tool into the insertion groove 2642.

Hereinafter, a method of assembling the vane ring assembly according to the third embodiment will be described.

After the locking key 2600 is inserted into and coupled to the through-hole 164, that is, outward from the inner side of the ring 160, the dovetail 242 of the compressor vane may be inserted into the dovetail groove 162. In this case, the locking key 2600 may be screwed to the through-hole 164 of the ring.

In order for the dovetail 242 to come into strong contact with the dovetail groove 162 after the dovetail 242 is inserted into the dovetail groove 162, the locking key 2600 may be rotated to move to the dovetail 242 by inserting the tool into the insertion groove 2642.

Thus, the dovetail may be tightly fixed by pressing both tapered surfaces 242b into the dovetail groove 162.

Finally, the locking key 2600 may be caulked to prevent the locking key 2600 from being released.

As is apparent from the above description, according to the present disclosure, it is possible to prevent the vibration of the vane by strongly pressing and fixing the vane to the ring, namely through strong contact between the contact surfaces of the dovetail of the vane and the dovetail groove of the ring such that the dovetail does not move in the dovetail groove.

Thus, it is possible to prevent the wear damage of the vane and to prevent the coupling force with the ring from weakening.

The present disclosure is not limited to the above effects, and it should be understood that the present disclosure includes all effects which can be inferred from the detailed description of the present disclosure or the configuration of the disclosure defined by the appended claims.

The present disclosure is not limited to the above-mentioned specific embodiments and description, and it will be apparent to those skilled in the art that various variations and modifications may be made without departing from the spirit and scope of the disclosure as defined in the following claims. Therefore, these variations and modifications fall within the scope of the disclosure.

What is claimed is:
1. A vane ring assembly comprising:
a retaining ring having an inner peripheral surface in which a dovetail groove is formed;
a vane including a dovetail inserted into the dovetail groove and an airfoil protruding from the dovetail in a radial direction of the retaining ring, the dovetail comprising:
a bottom surface facing away from the airfoil; and
tapered surfaces that are formed on opposite sides of the dovetail and are each inclined in an opposing direction to gradually reduce the distance between the tapered surfaces, the tapered surfaces extending toward the airfoil from the bottom surface; and
a locking key disposed between the bottom surface of the dovetail and the dovetail groove and configured to press the dovetail into the dovetail groove, the locking key comprising:
a first locking portion having a first diameter and coming into contact with the dovetail; and
a second locking portion having a second diameter smaller than the first diameter and extending in the radial direction of the retaining ring from the first locking portion so as to pass through the retaining ring in a radially outward direction,
wherein the first locking portion includes a flat surface of the first diameter, the flat surface configured to face a corresponding flat surface of the dovetail and press the dovetail in the radial direction of the retaining ring.
2. The vane ring assembly according to claim 1, wherein the second locking portion has a thread formed on its outer peripheral surface.

3. The vane ring assembly according to claim 1, wherein the second locking portion has an insertion groove formed at one end for insertion of a tool for rotating the second locking portion.

4. The vane ring assembly according to claim 1, wherein the locking key is inserted outward from an inner side of the retaining ring.

5. The vane ring assembly according to claim 1, wherein the retaining ring has a through-hole formed from a bottom surface of the dovetail groove to an outer surface of the retaining ring.

6. The vane ring assembly according to claim 1, wherein the locking key is caulked.

7. The vane ring assembly according to claim 1, wherein the first and second locking portions are formed integrally with each other.

8. A gas turbine comprising:
   a compressor to suck and compress air to a high pressure, the compressor accommodated in a compressor casing;
   a combustor to produce combustion gas by mixing the compressed air with fuel for combustion; and
   a turbine to rotate a turbine blade using the combustion gas and generate power,
   wherein the compressor comprises a vane ring assembly circumferentially fitted into one of the compressor casing or a vane carrier installed in the compressor casing, and
   wherein the vane ring assembly comprises:
      a retaining ring having an inner peripheral surface in which a dovetail groove is formed;
      a vane including a dovetail inserted into the dovetail groove and an airfoil protruding from the dovetail in a radial direction of the retaining ring, the dovetail comprising:
         a bottom surface facing away from the airfoil; and
         tapered surfaces that are formed on opposite sides of the dovetail and are each inclined in an opposing direction to gradually reduce the distance between the tapered surfaces, the tapered surfaces extending toward the airfoil from the bottom surface; and
      a locking key disposed between the bottom surface of the dovetail and the dovetail groove and configured to press the dovetail into the dovetail groove, the locking key comprising:
         a first locking portion having a first diameter and coming into contact with the dovetail; and
         a second locking portion having a second diameter smaller than the first diameter and extending in the radial direction of the retaining ring from the first locking portion so as to pass through the retaining ring in a radially outward direction,
      wherein the first locking portion includes a flat surface of the first diameter, the flat surface configured to face a corresponding flat surface of the dovetail and press the dovetail in the radial direction of the retaining ring.

9. The gas turbine according to claim 8, further comprising:
   a ring groove configured to receive the vane ring assembly and formed in one of the compressor casing or an inner peripheral surface of the vane carrier.

* * * * *